United States Patent
Nakahata et al.

(10) Patent No.: US 9,375,817 B2
(45) Date of Patent: Jun. 28, 2016

(54) TOOL EXCHANGER, TOOL MAGAZINE, AND MACHINE TOOL

(75) Inventors: Akira Nakahata, Minamitsuru-Gun (JP); Etsuro Misaki, Minamitsuru-Gun (JP); Tetsuya Kanamaru, Minamitsuru-Gun (JP); Hideo Komatsubara, Minamitsuru-Gun (JP)

(73) Assignee: Makino Milling Machine Co., Ltd., Tokyo (JP)

(*) Notice: Subject to any disclaimer, the term of this patent is extended or adjusted under 35 U.S.C. 154(b) by 641 days.

(21) Appl. No.: 13/821,817

(22) PCT Filed: Sep. 10, 2010

(86) PCT No.: PCT/JP2010/066112
§ 371 (c)(1),
(2), (4) Date: Mar. 8, 2013

(87) PCT Pub. No.: WO2012/032674
PCT Pub. Date: Mar. 15, 2012

(65) Prior Publication Data
US 2013/0172162 A1 Jul. 4, 2013

(51) Int. Cl.
*B23Q 3/155* (2006.01)
*B23Q 3/157* (2006.01)

(52) U.S. Cl.
CPC .............. *B23Q 3/1554* (2013.01); *B23Q 3/157* (2013.01); *B23Q 3/1572* (2013.01);
(Continued)

(58) Field of Classification Search
CPC .... B23Q 3/155; B23Q 3/1554; B23Q 3/1556; B23Q 3/157; B23Q 3/15713; B23Q 3/1572; Y10T 483/1757; Y10T 483/176; Y10T 483/1774; Y10T 483/1776; Y10T 483/1809; Y10T 483/1818; Y10T 483/1827; Y10T 483/1836
USPC ........... 483/40, 41, 47, 48, 58, 59, 60, 61, 62, 483/49
See application file for complete search history.

(56) References Cited

U.S. PATENT DOCUMENTS

| | | | |
|---|---|---|---|
| 6,450,932 B1 * | 9/2002 | Hirose | B23Q 3/1554 483/40 |
| 6,685,608 B2 * | 2/2004 | Menzio | B23Q 3/15533 483/3 |
| 6,857,995 B2 | 2/2005 | Maeda | |

(Continued)

FOREIGN PATENT DOCUMENTS

| | | | |
|---|---|---|---|
| EP | 2 191 933 | 6/2010 | |
| FR | 2648378 A1 * | 12/1990 | B23Q 3/15533 |

(Continued)

OTHER PUBLICATIONS

Extended European Search Report dated Feb. 19, 2014, directed to EP Application No. 10857015.1; 6 pages.
International Search Report mailed Oct. 12, 2010, directed towards International Application No. PCT/JP2010/066112; 6 pages.

*Primary Examiner* — Sunil K Singh
*Assistant Examiner* — Michael Vitale
(74) *Attorney, Agent, or Firm* — Morrison & Foerster LLP

(57) ABSTRACT

A tool exchanger for storing a tool (10) with a holding groove (12) formed at a periphery of the tool in a plurality of tool storage parts (302) provided in a tool magazine (300) so that a tool axis becomes substantially horizontal in direction, and taking out the tool from the tool storage parts (302), the tool exchanger including: a base part (100); a slider (200) provided in a side of the tool storage parts (302) slidably relative to the base part (100) in a direction substantially parallel to the tool axis; a holder (250) attached to the slider (200) in a movable manner relative to the slider, and having an engagement part (252) which engages with the holding groove (12) of the tool; and a moving portion moving the holder (250) relative to the slider (200), wherein the moving portion includes: a handle part (260) for exerting a rotary force about an axis extending substantially parallel to the tool axis; a first cam mechanism (250, 242) moving the holder in a plane substantially perpendicular to the tool axis in accordance with a first turning operation of the handle part (260); and a second cam mechanism (161, 270) moving the holder (250) along a direction of the tool axis in accordance with a second turning operation of the handle part (260) successive to the first turning operation.

1 Claim, 6 Drawing Sheets

(52) U.S. Cl.
CPC ....... *B23Q 3/15713* (2013.01); *B23Q 3/15526* (2013.01); *Y10T 483/13* (2015.01); *Y10T 483/176* (2015.01); *Y10T 483/1779* (2015.01); *Y10T 483/18* (2015.01); *Y10T 483/1827* (2015.01); *Y10T 483/1864* (2015.01)

(56) References Cited

U.S. PATENT DOCUMENTS 7,374,526 B1 * 5/2008 Wolschlager ...... B23Q 3/15706 483/3

FOREIGN PATENT DOCUMENTS

| | | |
|---|---|---|
| JP | 10-315086 | 12/1998 |
| JP | 2001-277064 | 10/2001 |
| JP | 2003-71673 | 3/2003 |
| JP | 3877560 | 11/2006 |
| JP | 2009-56547 | 3/2009 |
| JP | 2009-214270 | 9/2009 |
| JP | 2010-137322 | 6/2010 |
| WO | WO-2010/003642 | 1/2010 |

* cited by examiner

TOOL EXCHANGER, TOOL MAGAZINE, AND MACHINE TOOL

REFERENCE TO RELATED APPLICATIONS

This application is the national stage application under 35 USC 371 of International Application No. PCT/JP2010/066112, filed Sep. 10, 2010, the entire contents of which are incorporated herein by reference.

FIELD OF THE INVENTION

The present invention relates to a tool exchanger which stores a tool in a tool magazine and takes out a tool from the tool magazine and to a tool magazine and a machine tool which have such a tool exchanger.

BACKGROUND OF THE INVENTION

As a device for storing a tool in a tool magazine and taking out a tool from the tool magazine, in the past the device such as described in the following Patent Literature 1 has been known, which describes a tool attacher designed so that an attachment lever is operated to insert a tool in a pot of a tool magazine and to pull out a tool from the pot.

However, in the tool exchanger described in Patent Literature 1, the work of pulling out and inserting tools is carried out near the pots, so there are other tools present in the work area and therefore the work is poor in efficiency and is dangerous.

Further, the simple structure tool exchanger for exchanging tools of a ring-shaped tool magazine described in Patent Literature 2 or 3 is difficult to realize.

Japanese Unexamined Patent Publication No. 2009-56547 A1
Japanese Examined Patent Publication No. 3877560 B2
U.S. Pat. No. 6,857,995 B2

SUMMARY OF THE INVENTION

The present invention provides a tool exchanger for storing a tool with a holding groove formed at a periphery of the tool in a plurality of tool storage parts provided in a tool magazine so that a tool axis becomes substantially horizontal in direction, and taking out the tool from the tool storage parts, including: a slider provided slidably in a direction substantially parallel to the tool axis; a holder attached to the slider in a movable manner relative to the slider, and having an engagement part which engages with the holding groove of the tool; a handle portion provided at the slider in a rotatable manner relative to the slider; and a holder operating mechanism consecutively carrying out a first operation in which the holder is moved between a position of engagement with the holding groove of the tool and a retracted position separated from the tool and a second operation in which the holder is moved along a direction of the tool axis, by a turning operation of the handle portion in one direction.

Further, the present invention provides a tool exchanger for storing a tool with a holding groove formed at a periphery of the tool in a plurality of tool storage parts provided in a tool magazine so that a tool axis becomes substantially horizontal in direction, and taking out the tool from the tool storage parts, including: a slider provided slidably in a direction substantially parallel to the tool axis; a holder attached to the slider in a movable manner relative to the slider, and having an engagement part which engages with the holding groove of the tool; and a moving portion moving the holder relative to the slider, wherein the moving portion including: a handle part for exerting a rotary force about an axis extending substantially parallel to the tool axis; a first cam mechanism moving the holder in a plane substantially perpendicular to the tool axis in accordance with a first turning operation of the handle part; and a second cam mechanism moving the holder along a direction of the tool axis in accordance with a second turning operation of the handle part successive to the first turning operation.

Further, the present invention includes the above tool exchanger, tool storage parts being comprised of a plurality of tool pots arranged along an outer circumference of a ring-shaped member rotatably supported at a base part, and a drive portion rotating the ring-shaped member to index the ring-shaped member to a tool changing position where a tool is changed between a desired tool pot of the tool pots and a spindle of a machine tool and a tool exchanging position where the tool exchanger exchanges a tool.

Further, the present invention provides a machine tool provided with the above tool exchanger and a tool magazine having a drive portion for moving a tool stored in the tool storage part, including a detecting portion detecting whether the holder is at a retracted position where the holder is retracted from the tool storage part; and a control portion controlling the drive portion so as to permit a movement of the tool storage part if the detecting portion detects that the holder is at the retracted position and so as to prohibit the movement of the tool storage part if the detecting portion detects that the holder is not at the retracted position.

DETAILED DESCRIPTION OF THE INVENTION

Below, referring to FIG. 1 to FIG. 7, an embodiment of a tool exchanger according to the present invention will be explained.

Figure 1:
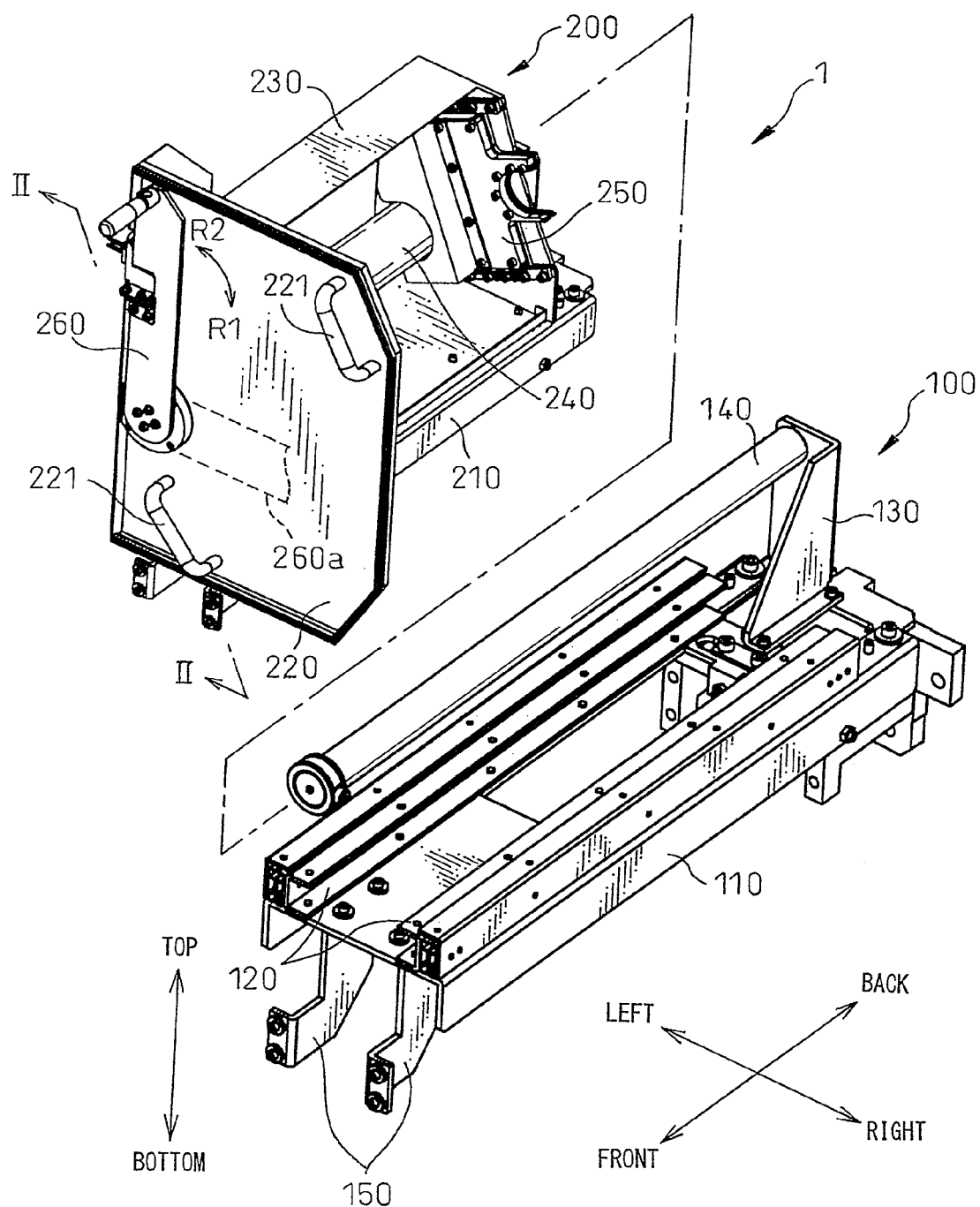
FIG. 1 is a disassembled perspective view which shows the configuration of a tool exchanger according to an embodiment of the present invention.
Figure 3:
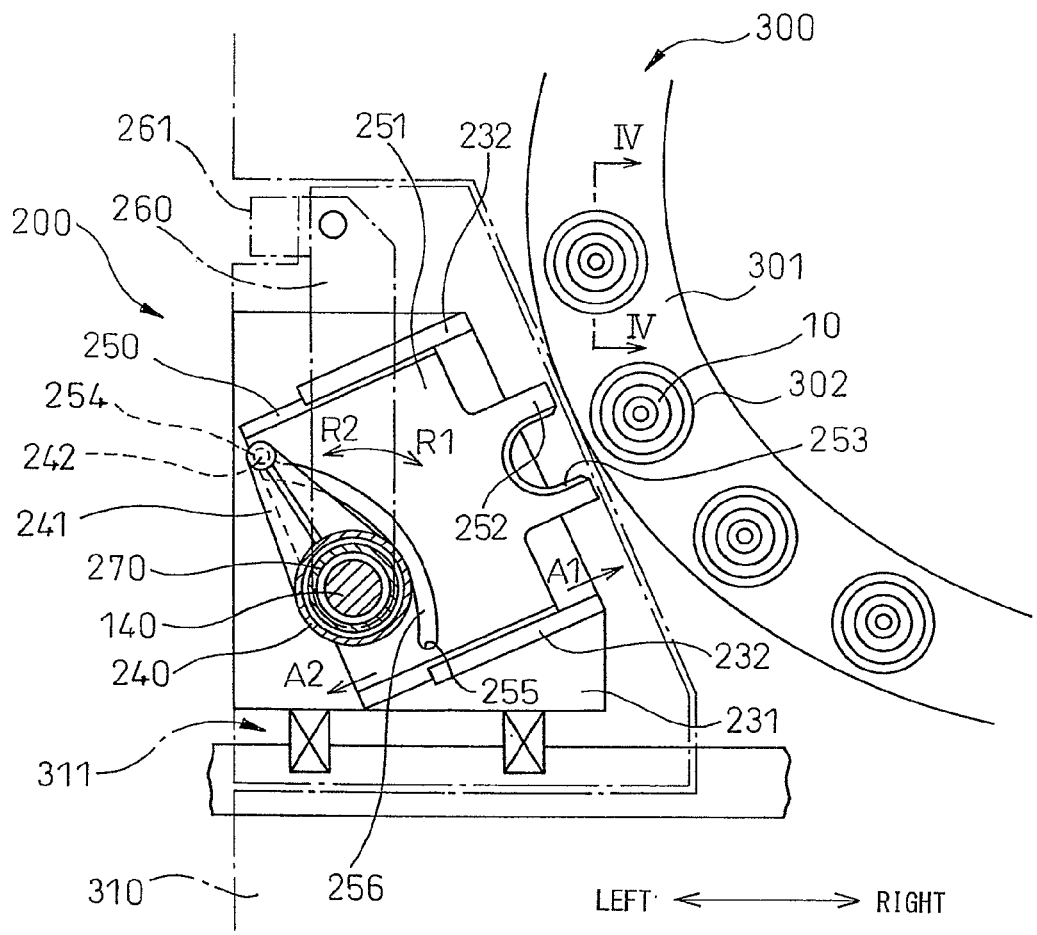
FIG. 3 is a cross-sectional view along the line of FIG. 2.

FIG. 1 is a disassembled perspective view which shows the configuration of a tool exchanger 1 according to an embodiment of the present invention. This tool exchanger 1, as shown in FIG. 3, is used for storing a tool 10 in a tool pot 302 of a tool magazine 300 and taking out a tool 10 from a tool pot 302. As shown in FIG. 1, the tool exchanger 1 according to the present embodiment has a base frame 100 and a slider 200 which is slidably mounted on the base frame 100. Note that, for convenience, the front, back, left, and right directions and the top and bottom directions are defined as illustrated. Below, these definitions will be followed to explain the configuration of the parts.

The base frame 100 has a base plate 110 which extends in the front-back direction, a left and right pair of rails 120 which extend on the base plate 110 in the front-back direction, a support plate 130 which is erected upward from the top surface of a back end part of the base plate 110, and a columnar shaped shaft 140 which extends forward from a back end surface of the support plate 130. The shaft 140 is supported by the support plate 130 in a cantilever manner. The base plate 110 is fastened through a support arm 150 etc. to a base (not shown), and a tool magazine 300 is arranged at the right side of the base frame 100 (see FIG. 3).

The slider 200 has a slide plate 210 which extends in the horizontal direction and slides along the rails 120 of the base frame 100 in the front-back direction, a front plate 220 which is fastened to a front end of the slide plate 210 and extends in a vertical direction, a cover 230 which covers a top surface, left side surface, and back surface of the slide plate 210, a cylinder shaped arm 240 which passes through the front plate 220 and extends over the slide plate 210 to the back, and a cam plate 250 which is provided at a back end part of the arm 240. At the front end part of the arm 240, a lever handle 260 is attached. By operating the lever handle 260 to turn it at the front of the front plate 220, the arm 240 is turned.

Figure 2:
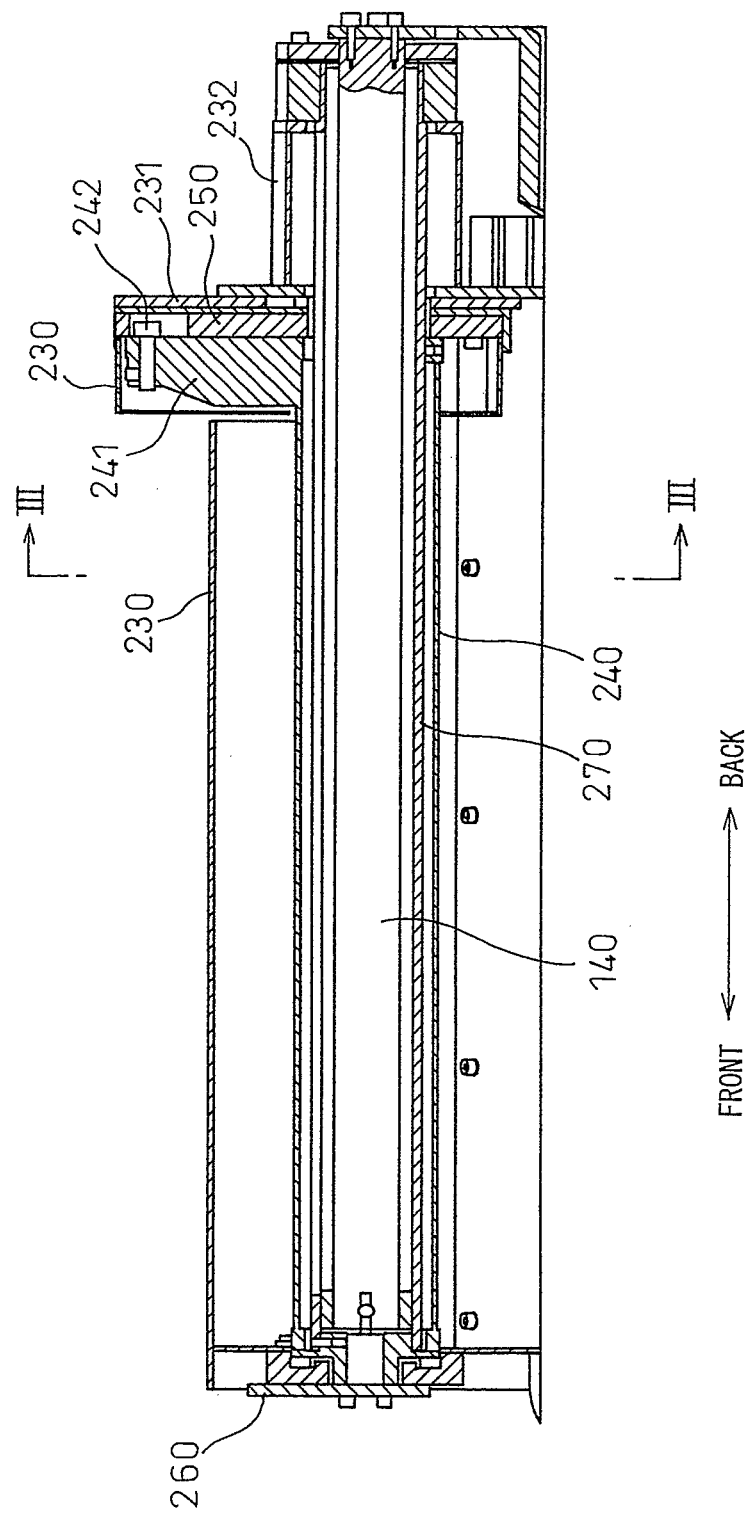
FIG. 2 is a cross-sectional view of principal parts in the assembled state of the tool exchanger of FIG. 1.

When attaching the slider 200 to the base frame 100, the shaft 140 of the base frame 100 is inserted inside of the arm 240, so the slide plate 210 is slidably mounted on the base plate 110. FIG. 2 is a cross-sectional view of principal parts of a tool exchanger 1 assembled in this way (cross-sectional view along line II-II of FIG. 1 in assembled state) and shows the state where the slider 200 has been slid to its backmost position. A cylinder shaped cylindrical cam 270 is inserted inside of the arm 240, and the shaft 140 is inserted inside of the cylindrical cam 270. The back end part of the cylindrical cam 270 sticks out backward from the back end surface of the arm 240 and the back surface of the cover 230. That sticking out part is held inside of a cylinder shaped tubular member 232 which sticks out backward from the back surface cover 231.

The front end part of the cylindrical cam 270 is fastened to the front end part of the arm 240, the back end part of the cylindrical cam 270 is fastened to the back end part of the tubular member 232, and the cylindrical cam 270, arm 240, and tubular member 232 are therefore joined together. The cylindrical cam 270 can move together with the arm 240 and the tubular member 232 on the circumference of the shaft 140 in the circumferential direction and axial direction.

FIG. 3 is a cross-sectional view along the line of FIG. 2. At the right side of the slider 200, the tool magazine 300 is set. The tool magazine 300 has a ring-shaped magazine main body 301 in the vertical plane. At the magazine main body 301, a plurality of tool pots 302 for storing tools are formed. In each tool pot 302, a tool 10 is housed in the horizontal direction (front-back direction). The magazine main body 301 is connected through a belt, chain, gear, etc. to a motor or other actuator and can be turned and indexed in accordance with the exchanging position of tools 10. The more detailed configuration of the tool magazine 300 is described in Patent Literature 2 or 3, so will be omitted here.

The tool magazine 300 is covered around it by a magazine cover 310. Part of the magazine cover 310 is provided with a recessed space 311. In this recessed space 311, near the magazine main body 310, the slider 200 is arranged slidably. If making the slider 200 slide forward, the slider 200 moves away from the tool magazine 300 and the side space of the slider 200 opens. Due to this, it becomes possible to easy attach and detach a tool 10 at the holder part 252 of the cam plate 250.

As shown in FIGS. 2 and 3, at the back end part of the shaft 240, the lever part 241 is provided from part of the outer circumference toward the outside in the radial direction. At the front end of the lever part 241, a cam follower 242 is provided facing backward. Between the lever part 241 and the back cover 231, a cam plate 250 is interposed to be able to move along the front surface of the back cover 231. The cam plate 250 has a plate part 251 and a holder part 252 which sticks out from the end face of the plate part 251. The holder part 252 is provided with a U-shaped projecting part 253 for holding a tool 10.

Figure 4:
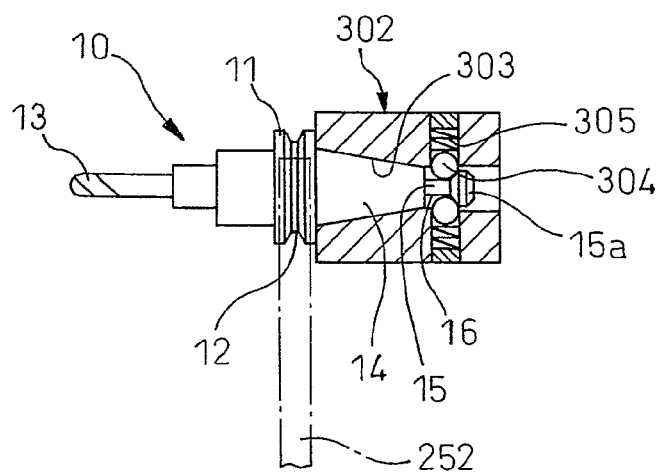
FIG. 4 is a cross-sectional view along the line IV-IV of FIG. 3.

FIG. 4 is a cross-sectional view along the line IV-IV of FIG. 3. At the center part of a tool 10 in the long direction (in the figure, the front-back direction), a cylinder shaped flange part 11 is provided. At the peripheral edge of the flange part 11, a holding groove 12 is provided over the entire circumference. The holding groove 12 can engage with a projecting part 253 of the holder part 251 of the cam plate 250. Due to this, the tool 10 can be held at the holder part 251. At the front side of the flange part 11, for example, a drill part 13 is formed for cutting the workpiece, while at the back side of the flange part 11, a frustoconical shaped taper shank part 14 is formed. At the end face of the taper shank part 14, a pull stud 15 is fastened. Between the taper shank part 14 and a head 15a of the pull stud 15, a recessed part 16 is formed.

At each tool pot 302, a tapered holding part 303 is provided corresponding to the taper shank part 14. At the back of the holding part 303, a plurality of balls 304 are arranged in the circumferential direction. The balls 304 are elastically supported by a spring 304 which is arranged at the outside in the radial direction. For this reason, by pushing a tool 10 backward against the elastic force of the spring 305, the head 15a of the pull stud 15 rides over the balls 304 whereby the balls 304 become positioned in the recessed part 16. Due to this, the tool 10 is stored and fastened in the tool pot 302 (stored state). By pulling the tool 10 forward against the elastic force of the spring 305 from this state, the head 15a of the pull stud 15 rides over the balls 304 and the tool 10 is pulled out from the tool pot 302 (withdrawn state).

As shown in FIG. 3, at the front surface of the back cover 231, a pair of guides 232 are attached. At the inside of the pair of guides 232, a plate part 251 is gripped in a slidable manner. The guides 232 are attached tilted toward the top right, while the cam plate 250 is arranged tilted so that the projecting part 253 opens toward the top right. For this reason, when the projecting part 253 holds a tool 10, the weight of the tool 10 acts on the projecting part 253 and the tool 10 can be stably held.

At the plate part 251 of the cam plate 250, a cam groove 256 is formed. At the cam groove 256, the cam follower 242 of the lever part 241 is engaged. Regarding the distance "h" from the center of rotation of the lever part 241 to the cam groove 253, the distance "h" gradually becomes smaller until the lever part 241 turns in the R1 direction of FIG. by a predetermined amount $\theta 1$, then the distance "h" becomes constant in the range by which the lever part 241 turns by a predetermined amount $\theta 2$.

For this reason, if the arm part 241 is turned by the rotation of the shaft 240, along with the turning operation, the cam plate 250 advances and retracts along the guides 232 toward the tool 10. At this time, the amount of advance and retraction of the cam plate 250 is determined in accordance with the pivoted position of the lever part 241. That is, if the amount of movement of the cam follower 242 from the end part 254 of the cam groove 253 is within a predetermined amount $\theta 1$, the cam plate 250 moves, while if over the predetermined amount $\theta 1$, it does not move. FIG. 3 shows the state where the holder part 252 of the cam plate 250 is separated from the tool magazine 300. If the lever part 241 turns in the R1 direction by a predetermined amount $\theta 1$ from this separated state, the holder part 252 engages with the holding groove 12 of a tool 10. This engaged state is maintained even if the amount of turning of the lever part 241 increases by the predetermined amount θ2. In the above configuration, the cam plate 250 (cam groove 256) and the cam follower 242 of the lever part 241 constitute a first cam mechanism.

Figure 5:
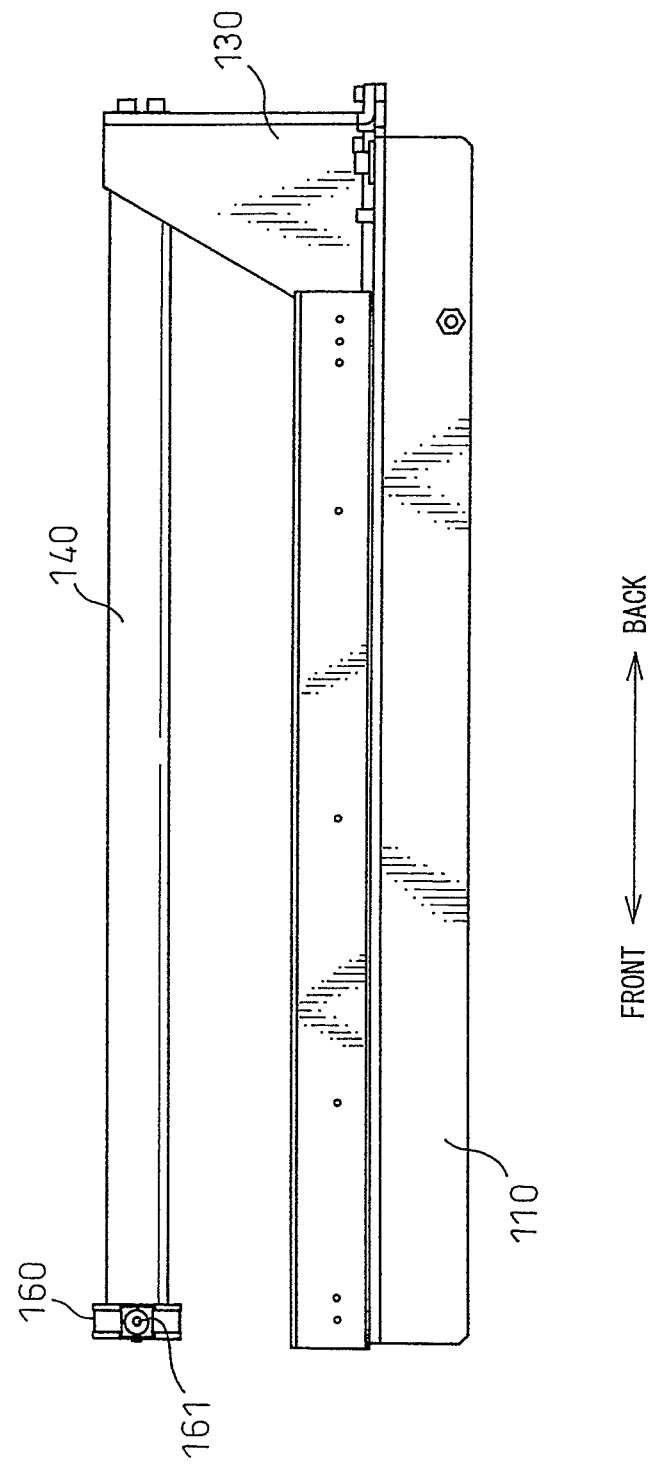
FIG. 5 is a side view of a base frame of FIG. 1.

FIG. 5 is a side view of the base frame 100 of FIG. 1 (view seen from right). At the outer circumference of the front end part of the shaft 140, a ring 160 is fitted and fastened. At the right surface of the ring 160, a cam follower 161 which engages with the cam groove 280 of the cylindrical cam 270 of the slider 200 is provided sticking out from it.

Figure 6:
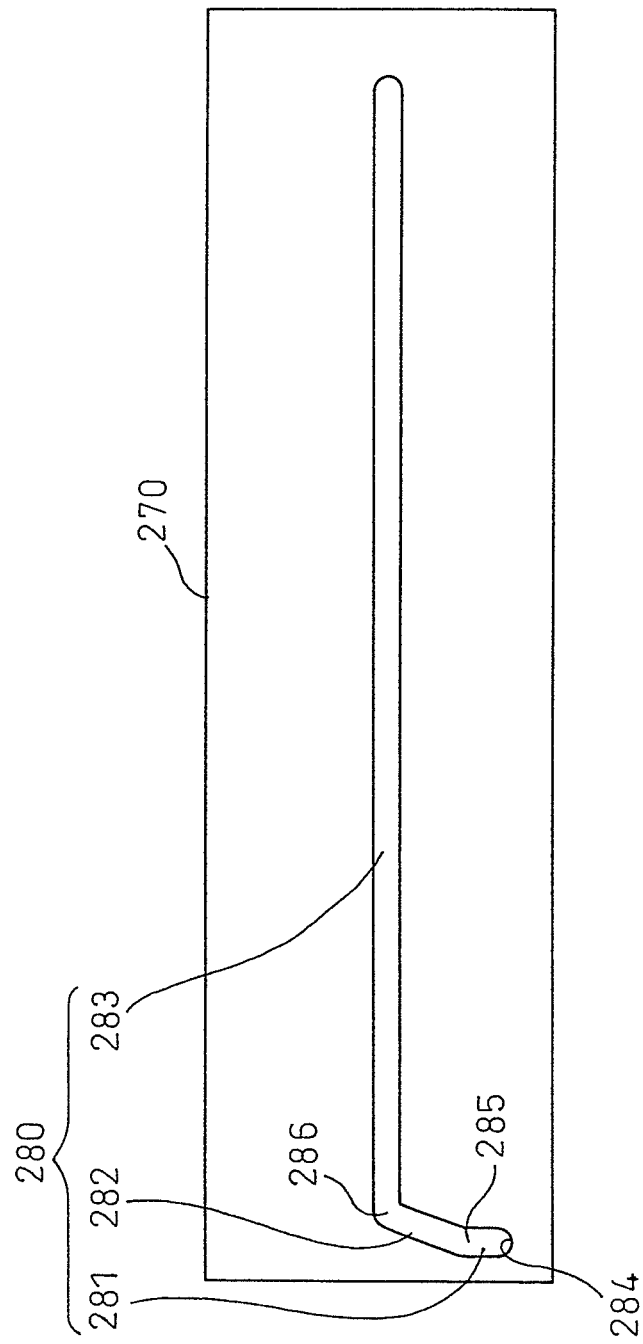
FIG. 6 is a developed view of a cylindrical cam which is provided at a slider of FIG. 1.

FIG. 6 is a developed view of the cylindrical cam 270 which shows the configuration of the cam groove 280. The cam groove 280 has a first cam groove 281 which is formed straight in the circumferential direction at the front end part of the cylindrical cam 270, a second cam groove 282 which is connected with the first cam groove 281 and is formed straight tilted to the back (circumferential direction and back), and a third cam groove 283 which is connected with the second cam groove 282 and is formed straight to the back. The angle from one end part 284 to the other end part 285 of the first cam groove 281 with reference to the center axis of the cylindrical cam 270 is equal to the above-mentioned θ1, while the angle from one end part 285 to the other end part 286 of the second cam groove 282 is equal to the above-mentioned θ2. In the above configuration, the cylindrical cam 270 (cam groove 280) and the cam follower 161 of the ring 160 constitute a second cam mechanism.

Next, the operation of the tool exchanger 1 according to the present embodiment will be explained. Below, as shown in FIG. 3, it is assumed that the slider 200 is positioned at the back end part of the base frame 100 and, as shown in FIG. 1, the lever handle 260 is at the home position vertically above it. This state is deemed the initial state. First, the extraction operation of pulling out a tool 10 which is stored in the tool magazine 300, that is, a tool 10 which is in the stored state, from the initial state will be explained. In the initial state, as shown in FIG. 3, the cam follower 242 of the first cam mechanism is positioned at the end part 254 of the cam groove 256, while the holder part 252 is at the back end position and the separated position separated from tool 10. At this time, the cam follower 161 of the second cam mechanism is positioned at the end part 284 of the first cam groove 281.

If operating the lever handle 260 from this state to turn in the R1 direction of FIG. 1 by a predetermined amount θ1, the cam follower 242 of the first cam mechanism moves along the cam groove 256 in the A1 direction. Due to this, the cam plate 250 approaches a tool 10, and the holder part 252 engages with a holding groove 12 of the tool 10. At this time, the cam follower 161 of the second cam mechanism moves relatively along the first cam groove 281 of the cylindrical cam 270, so the holder part 252 does not move in the front-back direction. Due to this, it is possible to make the holder part 252 advance toward a tool 10 in the plane perpendicular to the axis of the tool 10 while making the position of the holder part 252 in the front-back direction fixed, that is, maintaining the holder part 252 at the back end position, and to make easily and reliably the holder part 252 and tool 10 engage in state.

If, after this turning operation, operating the lever handle 260 to turn it in the R1 direction by the predetermined amount θ2, the cam follower 161 of the second cam mechanism moves relatively backward along the second cam groove 282 of the cylindrical cam 270. Due to this, the slider 200 advances together with the cylindrical cam 270, and the holder part 252 advances to an intermediate position. As a result, a tool 10 can be pulled out from the tool pot 302, and set in the extracted state. In this case, without operating the slider 200 to pull it forward, a tool 10 can be pulled out by a turning operation of the lever handle 260, so the work of pulling out a tool 10 against the spring force becomes easy. This work of pulling out a tool 10 is carried out by the rotating operation of the lever handle 260 on the outbound route.

After that, grips 221 which are provided at the front surface of the front plate 220 of the slider 200 (FIG. 1) are grasped and the slider 200 is made to slide forward. Due to this, the cam follower 161 of the second cam mechanism moves relatively backward along the third cam groove 283 of the cylindrical cam 270, while the holder part 252 advances to the advanced position. At this time, the engagement of the cam follower 161 and the cam groove 283 blocks rotation of the lever handle 260. Even if releasing the hand from the lever handle 260, the lever handle 260 is held at a predetermined pivoted position (FIG. 1, 260a).

After the slider 200 is made to slide to its frontmost position, the worker removes a tool 10 from the holder part 252 by hand and attaches another tool 10 to the holder part 252. In this case, the work of changing tools 10 can be carried out at a position away from the tool magazine 300, so it is possible to use a crane and possible to carry out work with a good efficiency safely.

Next, the storage operation of storing a tool 10 in the tool magazine 300 will be explained. The storage operation is carried out by a procedure opposite to the extraction operation. That is, first, a new tool 10 is placed so as to engage with the holder part 252. Further, the grips 221 are grasped and the slider 200 is pushed backward to make the slider 200 retract to the storage work position at the back end. At this time, the cam follower 161 of the second cam mechanism moves relatively along the third cam groove 283 of the cylindrical cam 270 while the lever handle 260 is held at a predetermined turned position 260a, and thus the holder part 252 of the cam plate 250 retracts to the intermediate position.

After that, if operating the lever handle 260 in the R2 direction of FIG. 3 to turn it by a predetermined amount θ2, the cam follower 161 of the second cam mechanism moves relatively along the second cam groove 282 and the holder part 252 retracts to the back end position. Due to this, a tool 10 is pushed into a tool pot 302 and is fastened stored in the tool magazine 300. After this rotating operation, if the lever handle 260 is operated in the R2 direction of FIG. 3 to turn it by a predetermined amount θ1, the cam plate 250 of the first cam mechanism moves to the side of the tool magazine 300 (A2 direction of FIG. 3), and the holder part 252 retracts to a retracted position away from the tool magazine 300. This storage work of the tool 10 is carried out by the rotating operation of the lever handle 260 on the return route. With this, the storage operation is ended.

In this way, according to the present embodiment, the base plate 100 is provided with the slider 200 in a manner able to slide in the front-back direction, while the slider 200 is provided with a cam plate 250 which engages with a holding groove 12 of a tool 10 in a movable manner. Further, by the operation of turning the lever handle 260 by a predetermined amount θ1, the holder part 252 of the cam plate 250 is made to advance and retract in the plane perpendicular to the axis of the tool 10 through the first cam mechanism. Further, by operating the lever handle 260 to turn by a predetermined amount θ2, the holder part 252 is made to advance and retract along the axis of a tool 10 through the second cam mechanism. Due to this, the holder part 252 can engage with the holding groove 12 of a tool 10 and the tool 10 can be pushed into a tool pot 302 or can be pulled out from a tool pot 302. In this case, by operating the lever handle 260 to turn in the R1 direction, a tool 10 can be pulled out from a tool pot 302 and a tool 10 can be moved to the front of the tool magazine 300. By operating the lever handle 260 to turn in the R2 direction, a tool 10 toward the tool magazine 300 can be moved backward and the tool 10 can be stored in a tool pot 302. Therefore, the work of storing and pulling out tools 10 becomes easy. Further, when operating the lever handle to turn in the R1 direction, the holder part 252 moves up to the advanced position away from the tool magazine 300, so the work of changing manually a tool 10 can be carried out easily.

Figure 7:
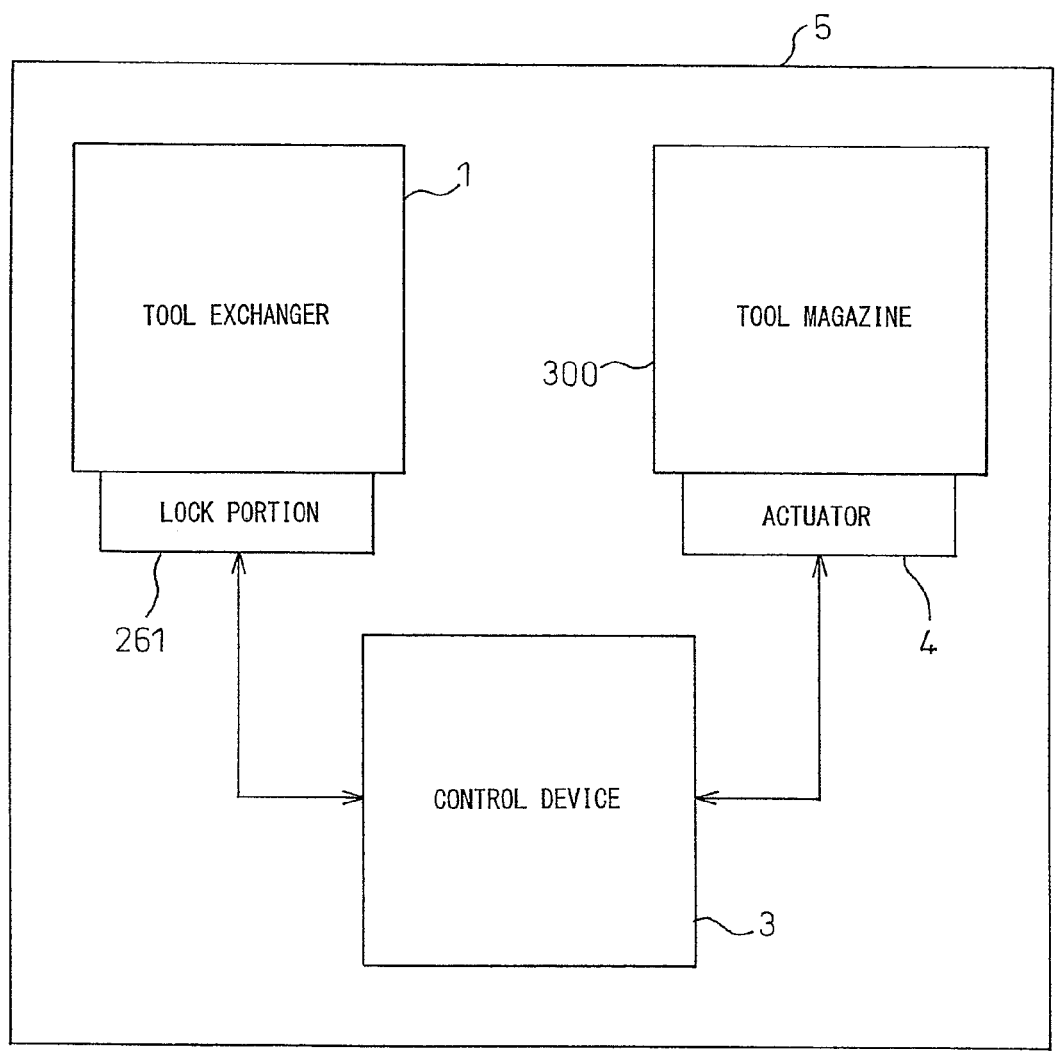
FIG. 7 is a view which shows the schematic configuration of a machine tool according to an embodiment of the present invention.

Above, a tool exchanger 1 is explained. A machine tool 5 which includes a tool exchanger 1 and a tool magazine 300 may for example be configured as follows:

FIG. 7 is a view which shows the schematic configuration of a machine tool 5 according to an embodiment of the present invention. In FIG. 7, the tool exchanger 1 is provided with a detector which detects whether the holder part 252 is at the retracted position. The detector 2 used as the detecting portion, for example, detects whether the lever handle 260 is in the initial state (FIG. 1) and can use a lock portion 261 for mechanical locking. The signal from the lock portion 261 is input to the control device 3 used as the control portion. The control device 3 is configured including a CPU. The control device 3 uses a signal from the lock portion 261 as the basis to decide whether the holder part 252 is at the retracted position. When deciding that the holder part 252 is at the retracted position, the control device 3 outputs an operation permit signal to the actuator 4 for driving the tool magazine 300. Due to this, the drive operation of the actuator 4 is permitted. On the other hand, if deciding that the holder part 252 is not at the retracted position, the control device 3 outputs a drive prohibit signal to the actuator 4. Due to this, the drive operation of the actuator 4 is prohibited. Note that, the actuator 4 used as the driving portion may be configured by an electric motor, etc.

In this way, by prohibiting operation of the tool magazine 300 when the holder part 252 is not at the retracted position, even if mistakenly inputting a drive command of the tool magazine 300, it is possible to prevent the rotation of the tool magazine 300 from causing the tool 10 to interfere with the cam plate 250 and therefore the machine tool 5 is improved in safety.

By using a limit switch which detects when the slider 200 is retracted the most and a limit switch which detects when the holder part 252 is at the retracted position, similar interlock control can be carried out. However, when the lever handle 260 is at the initial state, from the principle of the two cam mechanisms, the slider 200 is always retracted the most and the holder 252 is at the retracted position. Therefore, using a lock portion 261 which detects the initial state of the lever handle 260 and which mechanically locks the system has the effect that an interlock function whereby, if the lock portion 261 is not locked, the tool magazine 300 is not driven and if the tool magazine 300 is not at a stop, the lock portion 261 is not unlocked, is achieved by just a single lock portion 261.

Above, the cam plate 250 and the cam follower 242 are used to configure the first cam mechanism, while the cylindrical cam 270 and the cam follower 161 are used to configure the second cam mechanism. However, so long as the turning operation of the lever handle 260 serving as the handle part (first rotating operation) is used to work the first cam mechanism and the succeeding turning operation of the lever handle 260 (second rotating operation) is used to work the second cam mechanism and the holder part 252 is moveed in the plane perpendicular to the axis of the tool 10 and along the axis of the tool 10, the configuration of the moving portion is not limited to this. For example, it is also possible to use a gear mechanism or a link mechanism which can convert successive operations of turning the lever handle 260 in one direction to a series of operations of an advancing and retracting operation in a direction perpendicular to the tool axis of the holder part 252 and an advancing and retracting operation in a direction parallel to the tool axis. Here, the "successive operations of turning" means turning operations which are successively carried out in the same direction. The order of the first turning operation and second turning operation is no object. That is, both of the case where the second turning operation is carried out after the first turning operation and the case where the second turning operation is carried out before the first turning operation are included.

In the above embodiment, although the cam plate 250 is provided with a holder part 252 (engagement part) which engages with a holding groove 12 of a tool 10, the configuration of the holder is not limited to this. The base frame 100 (base part) may be configured in any way so long as able to provide slidably the slider 200 in a direction substantially parallel to the tool axis. The tool pot 302 used as the tool storage part may be made any shape.

Above, although an example of application of the tool exchanger to a ring type tool magazine 300 is explained, the tool exchanger of the present invention may similarly be applied to another chain type or matrix type of tool magazine.

The invention claimed is:

1. A tool exchanger for storing a tool with a holding groove formed at a periphery of the tool in a plurality of tool storage parts provided in a tool magazine so that a tool axis of the tool lies substantially in a horizontal direction, and taking out the tool from the tool storage parts, the tool exchanger comprising:
   a slider provided slidably in a direction substantially parallel to the tool axis;
   a holder attached to the slider in a movable manner relative to the slider, and having an engagement part which engages with the holding groove of the tool; and
   a moving portion moving the holder relative to the slider,
   wherein the moving portion comprises a handle part for exerting a rotary force about an axis extending substantially parallel to the tool axis, a first cam mechanism moving the holder in a plane substantially perpendicular to the tool axis in accordance with a first turning operation of the handle part, and a second cam mechanism moving the holder along a direction of the tool axis in accordance with a second turning operation of the handle part successive to the first turning operation, and
   wherein the first cam mechanism moves the holder toward the tool storage part in a plane substantially perpendicular to the tool axis by the first turning operation and then the second cam mechanism moves the holder away from the tool storage part along the direction of the tool axis by the second turning operation, when the tool is taken out from the tool magazine, and the second cam mechanism moves the holder toward the tool storage part along the direction of the tool axis by the second turning operation and then the first cam mechanism moves the holder away from the tool storage part in a plane substantially perpendicular to the tool axis by the first turning operation, when the tool is stored in the tool magazine.

* * * * *